(12) United States Patent
Koya (10) Patent No.: US 9,616,835 B2
(45) Date of Patent: Apr. 11, 2017

(54) VEHICLE-MOUNTED EMERGENCY REPORT DEVICE

(71) Applicant: DENSO CORPORATION, Kariya, Aichi-pref. (JP)

(72) Inventor: Hidetaka Koya, Anjo (JP)

(73) Assignee: DENSO CORPORATION, Kariya, Aichi-pref (JP)

(*) Notice: Subject to any disclaimer, the term of this patent is extended or adjusted under 35 U.S.C. 154(b) by 0 days.

(21) Appl. No.: 14/778,015

(22) PCT Filed: Mar. 5, 2014

(86) PCT No.: PCT/JP2014/001204
§ 371 (c)(1),
(2) Date: Sep. 17, 2015

(87) PCT Pub. No.: WO2014/147982
PCT Pub. Date: Sep. 25, 2014

(65) Prior Publication Data
US 2016/0144816 A1   May 26, 2016

(30) Foreign Application Priority Data

Mar. 21, 2013 (JP) .................................. 2013-058526

(51) Int. Cl.
*B60Q 1/00* (2006.01)
*B60R 21/00* (2006.01)
(Continued)

(52) U.S. Cl.
CPC .............. *B60R 21/00* (2013.01); *G08B 19/00* (2013.01); *G08B 21/182* (2013.01); *G08B 25/10* (2013.01);
(Continued)

(58) Field of Classification Search
CPC ........ G08B 25/14; G08B 25/10; G08B 19/00; G08B 21/182; B60L 11/1857; B60R 21/00; H04M 1/72569
(Continued)

(56) References Cited

U.S. PATENT DOCUMENTS

| 5,703,465 A | 12/1997 | Kinoshita et al. |
| 2002/0003417 A1 | 1/2002 | Bito et al. |

(Continued)

FOREIGN PATENT DOCUMENTS

| JP | H07243693 A | 9/1995 |
| JP | H08331769 A | 12/1996 |

(Continued)

OTHER PUBLICATIONS

International Search Report and Written Opinion (in Japanese with English Translation) for PCT/JP2014/001204, mailed May 20, 2014; ISA/JP.

*Primary Examiner* — Thomas Mullen
(74) *Attorney, Agent, or Firm* — Harness, Dickey & Pierce, P.L.C.

(57) ABSTRACT

A vehicle-mounted emergency report device having a function of transmitting an emergency report signal to a center device via a communication network when a vehicle has been determined to collide, includes a backup battery supplying an operating power when electric power supplied from a vehicle battery decreases, and a voltage detection unit detecting a voltage of the backup battery. Also, the vehicle-mounted emergency report device has a first determination unit determining whether the voltage detected is lower than a battery exhaustion warning threshold, a second determination unit determining whether a second order differential coefficient calculated by differentiating a battery voltage function twice by time is negative, and a warning unit refraining from warning when the voltage detected is lower than the threshold and the coefficient is not negative, and warning when the coefficient is negative. Thus, decrease of (Continued)

a discharge performance of the backup battery can be detected accurately.

5 Claims, 7 Drawing Sheets (51) Int. Cl.
    *G08B 25/10*    (2006.01)
    *G08B 25/14*    (2006.01)
    *G08B 19/00*    (2006.01)
    *G08B 21/18*    (2006.01)
    *H04M 1/725*    (2006.01)
    *B60R 21/01*    (2006.01)

(52) U.S. Cl.
    CPC ........ *G08B 25/14* (2013.01); *H04M 1/72569* (2013.01); *B60R 2021/0027* (2013.01); *B60R 2021/01088* (2013.01)

(58) Field of Classification Search
    USPC .......... 340/436, 455, 636.11, 636.15, 636.19
    See application file for complete search history.

(56) References Cited

U.S. PATENT DOCUMENTS

| | | |
|---|---|---|
| 2006/0055374 A1 | 3/2006 | Fujihara et al. |
| 2011/0037603 A1 | 2/2011 | Egawa |
| 2011/0062777 A1* | 3/2011 | Sotnikow .............. H02J 7/1423 307/9.1 |
| 2011/0104530 A1 | 5/2011 | Muller et al. |
| 2011/0115441 A1 | 5/2011 | Matsuyama et al. |
| 2011/0281545 A1* | 11/2011 | Murakami ........... G08B 25/006 455/404.1 |
| 2012/0001746 A1* | 1/2012 | Kamiya .................... H02J 7/04 340/449 |
| 2012/0188105 A1* | 7/2012 | Alkhalaf ............ B60R 16/0232 340/989 |
| 2013/0106594 A1* | 5/2013 | Hiramatsu ........... B60L 3/0007 340/436 |

FOREIGN PATENT DOCUMENTS

| | | |
|---|---|---|
| JP | H09182311 A | 7/1997 |
| JP | 2001314039 A | 11/2001 |
| JP | 2003007354 A | 1/2003 |
| JP | 2003197271 A | 7/2003 |
| JP | 2004191193 A | 7/2004 |
| JP | 2005020955 A | 1/2005 |
| JP | 2006343230 A | 12/2006 |
| JP | 2007157665 A | 6/2007 |
| JP | 2011076358 A | 4/2011 |
| JP | 2011109824 A | 6/2011 |
| JP | 2012247909 A | 12/2012 |
| WO | WO-2009133726 A1 | 11/2009 |
| WO | WO-2012160948 A1 | 11/2012 |

* cited by examiner

VEHICLE-MOUNTED EMERGENCY REPORT DEVICE

CROSS REFERENCE TO RELATED APPLICATIONS

This application is a U.S. National Phase Application under 35 U.S.C. 371 of International Application No. PCT/JP2014/001204 filed on Mar. 5, 2014 and published in Japanese as WO 2014/147982 A1 on Sep. 25, 2014. This application is based on and claims the benefit of priority from Japanese Patent Application No. 2013-058526 filed on Mar. 21, 2013. The entire disclosures of all of the above applications are incorporated herein by reference.

TECHNICAL FIELD

The present disclosure relates to a vehicle-mounted emergency report device having a function of transmitting an emergency report signal to a center device.

BACKGROUND ART

A vehicle-mounted emergency report device mounted on a vehicle has a backup battery including a rechargeable battery such as a lithium ion battery or the like. The vehicle-mounted emergency report device can operate using the backup battery when a vehicle battery is damaged due to a traffic accident or the like. When the backup battery is exhausted during an emergency report operation such as using the backup battery for a voice call, the emergency report operation will be interrupted suddenly. To avoid such a situation, a voltage of the backup battery is detected and battery exhaustion is warned beforehand when the voltage detected drops below a predetermined reference voltage. Since the backup battery has a property that a discharge performance decreases in a low-temperature environment, the battery exhaustion of the backup battery is likely to occur in the low-temperature environment.

PRIOR ART LITERATURE

Patent Literature

Patent Literature 1: JP H07-243693A

SUMMARY OF INVENTION

When the emergency report operation is continued after the voltage of the backup battery reduces lower than the predetermined reference voltage and the battery exhaustion is warned in the low-temperature environment below a freezing point, there was a case where the voltage of the backup battery begins to increase and exceeds the reference voltage, and a battery performance recovers. Considering such a possibility of the battery performance recovering, if a warning control of immediately warning of the battery exhaustion when the detected voltage of the backup battery reduces lower than the reference voltage is performed, the emergency report operation needs to be interrupted even when the backup battery has a sufficient discharge performance.

Therefore, it is an object of the present disclosure to provide a vehicle-mounted emergency report device capable of detecting decrease of a discharge performance of a backup battery accurately.

According to a first aspect of the present disclosure, a vehicle-mounted emergency report device has a function of transmitting an emergency report signal to a center device via a communication network when a vehicle has been determined to collide, and is configured to operate using electric power supplied from a vehicle battery as an operating power. The vehicle-mounted emergency report device has a backup battery that supplies the operating power for the vehicle-mounted emergency report device when the electric power supplied from the vehicle battery decreases, and a voltage detection unit that detects a voltage of the backup battery. Also, the vehicle-mounted emergency report device has a first determination unit that determines whether the voltage detected by the voltage detection unit is lower than a battery exhaustion warning threshold, and a second determination unit that determines whether a second order differential coefficient calculated by differentiating a battery voltage function twice by time is negative. Furthermore, the vehicle-mounted emergency report device has a warning unit that does not warn of the battery exhaustion when the detected voltage is lower than the battery exhaustion warning threshold and the second order differential coefficient is not negative, and warns of the battery exhaustion when the second order differential coefficient is negative. According to the structure described above, the decrease of the discharge performance of the backup battery can be detected accurately.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

A first embodiment of the present disclosure will be described hereinafter with reference to FIG. 1 to FIG. 7.

Figure 1:
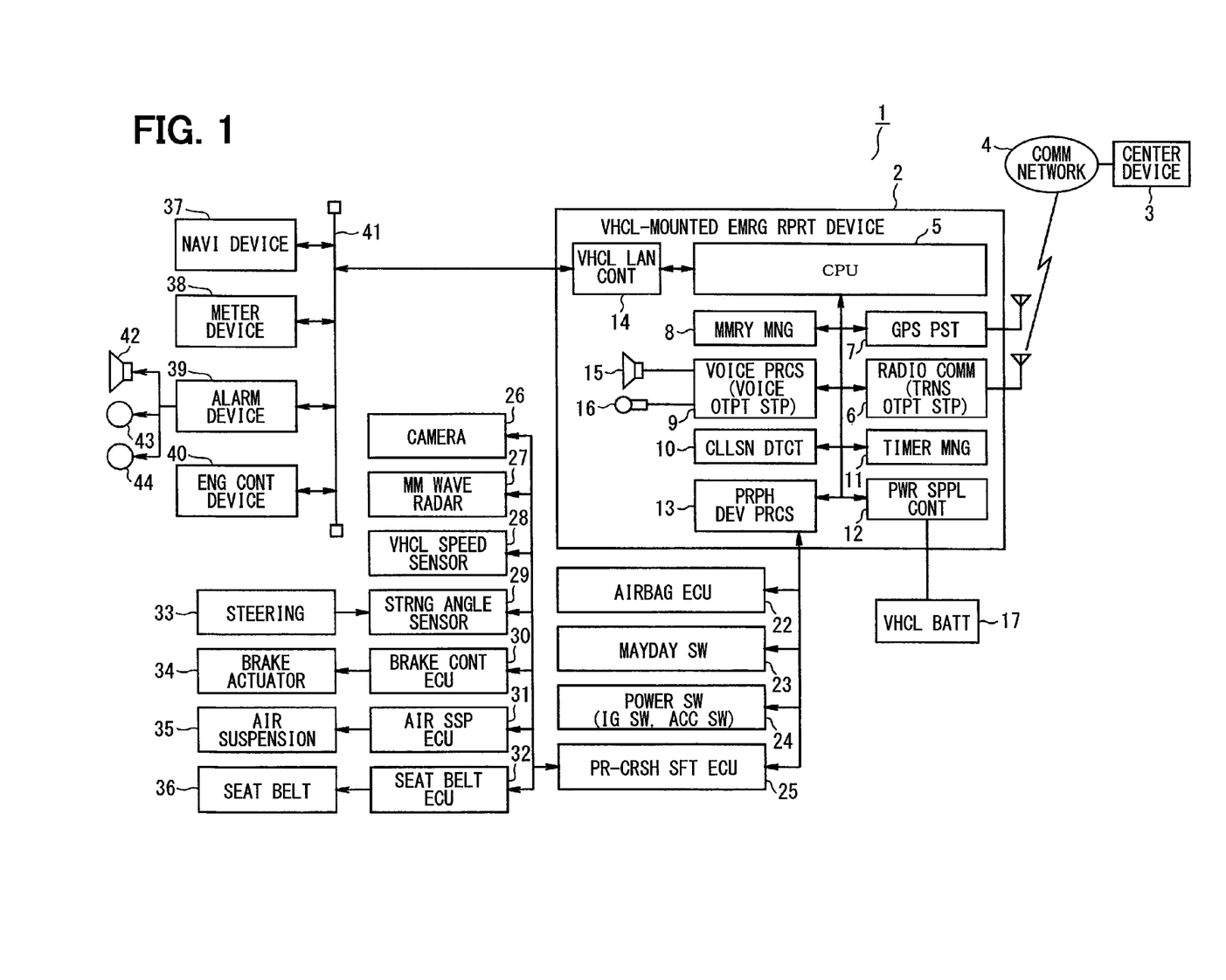
FIG. 1 is a functional block diagram of an entire structure of an emergency report system including a vehicle-mounted emergency report device according to a first embodiment of the present disclosure.

FIG. 1 is a functional block diagram schematically illustrating an entire structure of an emergency report system of the present embodiment. The emergency report system 1 has a vehicle-mounted emergency report device 2 mounted on a vehicle and a center device 3 provided in a service center, which are connected via a communication network 4. The communication network 4 includes a mobile communication network and a fixed communication network.

The vehicle-mounted emergency report device 2 includes a CPU 5, a radio communication unit 6, a GPS positioning unit 7, a memory management unit 8, a voice processing unit 9, a collision detection unit 10, a timer management unit 11, a power supply control unit 12, a peripheral device processing unit 13 and a vehicle LAN control unit 14. The CPU 5 functions as a control unit controlling an entire operation of the vehicle-mounted emergency report device 2 by executing a control program.

The radio communication unit 6 controls a radio communication with the center device 3 via the communication network 4, converts a voice call and a data communication while keeping a communication line connected, and enables the voice call and the data communication between an occupant in the vehicle and an operator in the service center. The radio communication unit 6 functions as a transmission output setup unit variably controlling a magnitude of a transmission power of the radio communication according to a control signal from the CPU 5.

The GPS positioning unit 7 receives a GPS signal transmitted from a GPS satellite and acquires (positions) a position of the vehicle by calculating parameters extracted from the GPS signal. The memory management unit 8 stores and manages various memory information such as occupant information (user information), vehicle information, position information of the vehicle acquired from the GPS positioning unit 7.

The voice processing unit 9 processes a transmitted voice received from a microphone 15, and processes a received voice and outputs the received voice from a speaker 16. The voice processing unit 9 functions as a voice output setup unit variably controlling a magnitude of a voice output of the received voice (call voice) according to the control signal from the CPU 5. The timer management unit 11 starts to time when receiving a timing start signal from the CPU 5, and transmits a timing finish signal to the CPU 5 when finishing timing of a predetermined time period (time up).

Figure 2:
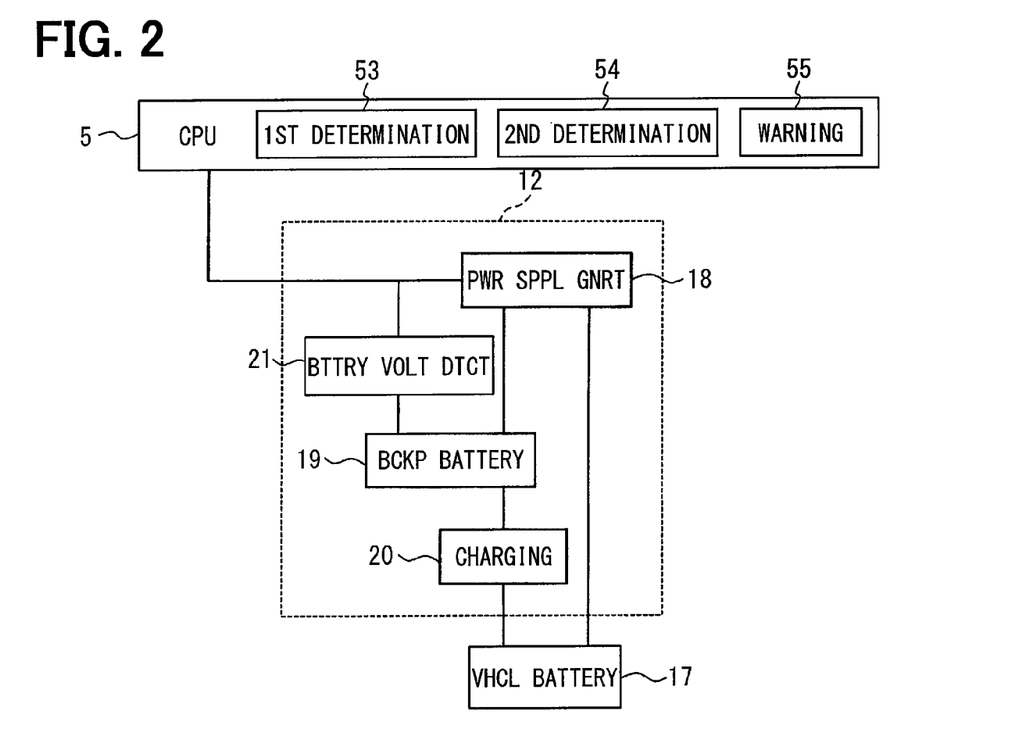
FIG. 2 is a functional block diagram of a power supply control unit of the vehicle-mounted emergency report device.

The power supply control unit 12 has a function of operating the vehicle-mounted emergency report device 2 by supplying each of functional blocks with electric power supplied from a vehicle battery 17 mounted in the vehicle as an operating power. As shown in FIG. 2, the power supply control unit 12 includes a power supply generation unit 18, a backup battery 19, a charging unit 20 and a battery voltage detection unit (a voltage detection device, a voltage detection unit) 21. The power supply generation unit 18 generates electric power to be supplied to each of the functional blocks and supplies the electric power generated to each of the functional blocks using the electric power supplied from the vehicle battery 17 as the operating power. When the vehicle battery 17 is damaged, that is, the electric power is not supplied from the vehicle battery 17 or the power supply decreases, the power supply generation unit 18 generates the electric power to be supplied to each of the functional blocks and supplies the electric power generated to each of the functional blocks using electric power supplied from the backup battery 19 as the operating power.

The backup battery 19 includes a rechargeable battery such as a lithium ion battery or a nickel-hydrogen battery. The backup battery 19 is configured to be charged with the electric power supplied from the vehicle battery 17 through the charging unit 20.

Figure 3:
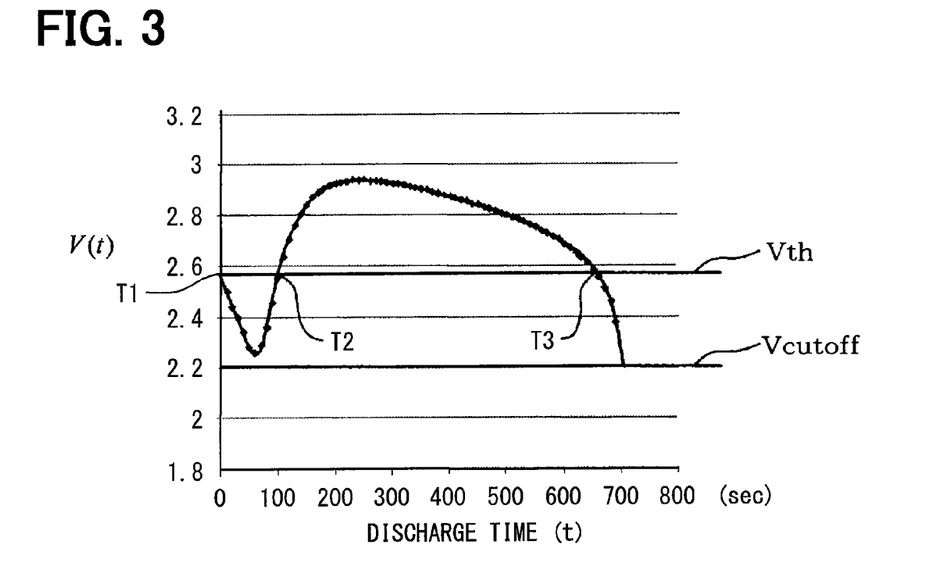
FIG. 3 is a characteristic diagram of a detected voltage function V(t) of a backup battery.

The battery voltage detection unit 21 detects, for example, a voltage of the backup battery 19 as a battery ability (a battery capacity, a discharge performance) of the backup battery 19, and outputs a detection signal of the voltage detected to the CPU 5. The CPU 5 can store a detected voltage value of the backup battery 19 in a memory (for example, the memory management unit 8) at a predetermined sampling interval (for example, every 1 or 0.5 seconds). The CPU 5 has a function of calculating a detected voltage function V(t) (a battery voltage function V(t)) based on a predetermined number of the detected voltage values $V(t_n)$ stored. A characteristic diagram of the detected voltage function V(t) (a curve of the detected voltage value $V(t_n)$) is shown in FIG. 3. In FIG. 3, a horizontal axis represents a discharge time t and a vertical axis represents the detected voltage V(t) (the detected voltage value $V(t_n)$).

Figure 4:
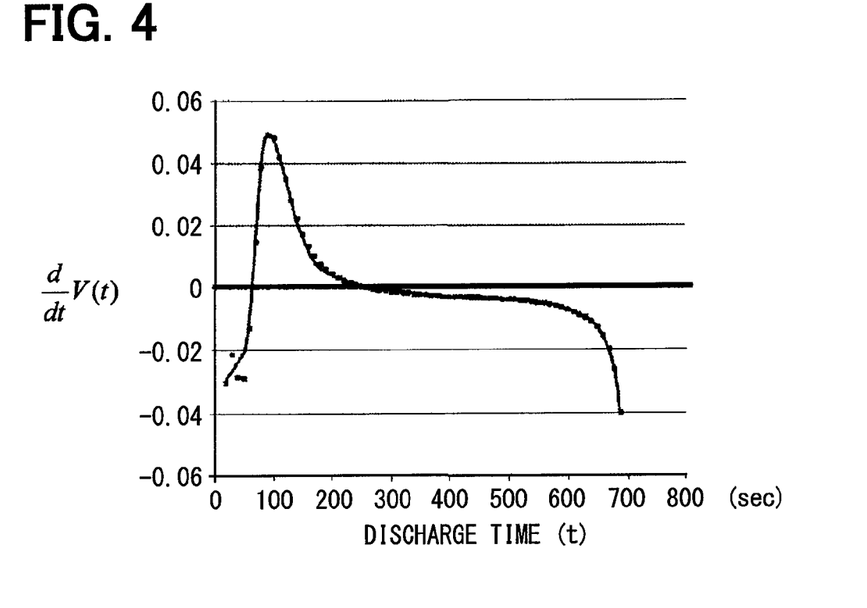
FIG. 4 is a characteristic diagram of a first order differential function calculated by differentiating the detected voltage function V(t) of the backup battery by time t.

The CPU 5 has a function of calculating a first order differential function d/dt (V(t)) by differentiating the detected voltage function V(t) by time t. A characteristic diagram of the first order differential function d/dt (V(t)) (a curve of the first order differential function) is shown in FIG. 4. In FIG. 4, a horizontal axis represents the discharge time t and a vertical axis represents the first order differential function d/dt (V(t)) of the detected voltage function V(t).

Figure 5:
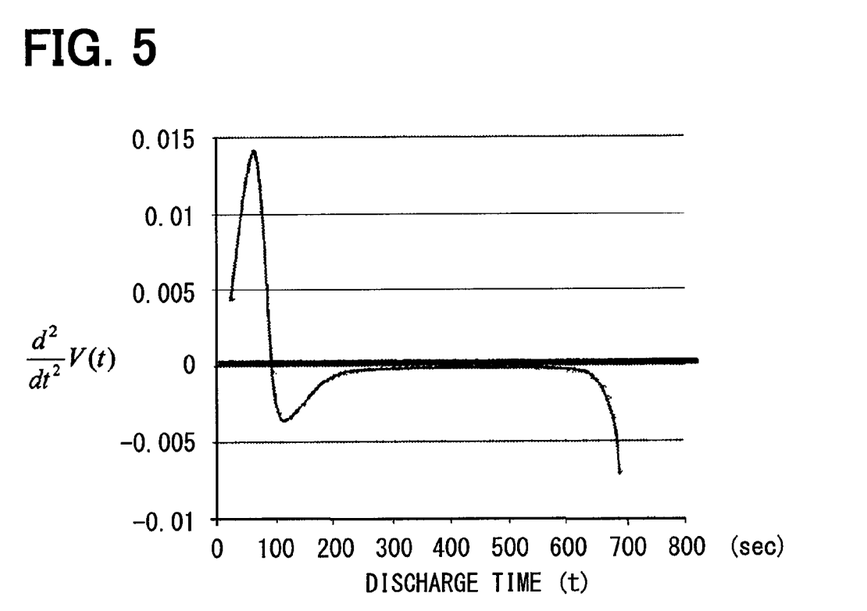
FIG. 5 is a characteristic diagram of a second order differential function calculated by differentiating the detected voltage function V(t) of the backup battery twice by time t.

The CPU 5 has a function of calculating a second order differential function $d^2/d^2t$ (V(t)) by differentiating the first order differential function d/dt (V(t)) by time t (that is, a function of calculating the second order differential function $d^2/d^2t$ (V(t)) by differentiating the detected voltage function V(t) twice by time t). A characteristic diagram of the second order differential function $d^2/d^2t$ (V(t)) (a curve of the second order differential function) is shown in FIG. 5. In FIG. 5, a horizontal axis represents the discharge time t and a vertical axis represents the second order differential function $d^2/d^2t$ (V(t)) of the detected voltage function V(t).

As shown in FIG. 1, the peripheral device processing unit 13 is connected with an airbag ECU 22, a Mayday switch 23, a power switch 24 and a pre-crash safety ECU 25. The airbag ECU 22 is connected with an airbag (not illustrated). The airbag ECU 22 can operate when an IG (ignition) signal output from the power switch 24 indicates on, and outputs an airbag deployment signal after the airbag is deployed.

The Mayday switch 23 outputs an operation detection signal when operated by the occupant. The power switch 24 has an IG switch and an ACC (accessory) switch, and outputs the IG signal indicating on/off of the IG switch and an ACC signal indicating on/off of the ACC switch. The pre-crash safety ECU 25 is connected with a camera 26, a millimeter wave radar 27, a vehicle speed sensor 28, a steering angle sensor 29, a brake control ECU 30, an air suspension ECU 31 and a seat belt ECU 32.

The pre-crash safety ECU 25 can operate when the IG signal output from the power switch 24 indicates on. The pre-crash safety ECU 25 analyzes, for example, an image signal received from the camera 26, a radar detection signal received from the millimeter wave radar 27, a vehicle speed signal received from the vehicle speed sensor 28 and a steering angle signal showing a steering angle of a steering wheel 33 received from the steering angle sensor 29. The pre-crash safety ECU 25 determines whether there is a possibility that the vehicle collides with a vehicle ahead, an obstacle or the like. When the pre-crash safety ECU 25 determines that there is the possibility of the vehicle collision, the pre-crash safety ECU 25 outputs a pre-crash detection signal.

After the pre-crash safety ECU 25 outputs the pre-crash detection signal, the pre-crash safety ECU 25 prepares for easing an impact generated in the event of the vehicle collision by activating a brake actuator 34 through the brake control ECU 30, activating an air suspension 35 through the air suspension ECU 31 and winding a seat belt 36 through the seat belt ECU 32. The pre-crash safety ECU 25 is also connected with a meter (not illustrated) and when the pre-crash safety ECU 25 determines that there is the possibility of the vehicle collision, the pre-crash safety ECU 25 controls the meter to display a warning to indicate that there is the possibility of the vehicle collision on the meter.

The vehicle LAN control unit 14 is connected with a navigation device 37, a meter device 38, an alarm device 39 and an engine control device 40 through a vehicle LAN 41. The vehicle LAN control unit 14 controls operations of the devices 37 to 40 by transmitting/receiving signals between the devices 37 to 40. The alarm device 39 is connected with a horn 42, a headlight 43 and a hazard lamp 44. The meter device 38 measures vehicle-related parameters such as speed, distance or any other vehicle-related parameter.

Next, an operation of the vehicle-mounted emergency report device 2 having the structure described above, especially, a control of warning the user by detecting a decrease of the battery ability (discharge performance) of the backup battery 19 will be explained with reference to FIG. 6 and FIG. 7. Flowcharts of FIG. 6 and FIG. 7 indicate contents of the control of the vehicle-mounted emergency report device 2.

The operation of the vehicle-mounted emergency report device 2 when the battery ability of the backup battery 19, for example, the voltage decreases in a low-temperature (below a freezing point) environment will be described based on the characteristic diagram in FIG. 3. As shown in FIG. 3, after the detected voltage of the backup battery 19 drops below a battery exhaustion warning threshold Vth (predetermined reference voltage), the detected voltage begins to increase prior to reaching a voltage value Vcutoff (predetermined voltage, for example, 2.2 V) where the battery becomes inoperative. After the detected voltage begins to increase, the detected voltage exceeds the battery exhaustion warning threshold Vth and this exceeding state (normal operation state) is kept for a specified time. In such a case, when the battery exhaustion is warned in a period between a time T1 and a time T2 (in a state where the detected voltage is equal to or lower than the battery exhaustion warning threshold Vth), there was a case where an incorrect warning is provided to the user that the backup battery can be used no longer due to the battery exhaustion even though the backup battery 19 can be still used. As shown in FIG. 3, after the detected voltage reduces lower than the battery exhaustion warning threshold Vth at a time T3, the detected voltage will not increase again, so the battery exhaustion needs to be warned immediately at the time T3.

The inventor of the present disclosure discovered that the period between the time T1 and the time T2 can be distinguished from a period on and after the time T3 by determining whether the second order differential function $d^2/d^2t$ (V(t)) calculated by differentiating the detected voltage function V(t) of the backup battery 19 twice by time t is positive or negative. Specifically, the second order differential function $d^2/d^2t$ (V(t)) is not negative (i.e., is positive) in the period between the time T1 and the time T2, that is, the curve of the detected voltage function V(t) has a downwardly convex shape. On the other hand, the second order differential function $d^2/d^2t$ (V(t)) is negative on and after the time T3, that is, the curve of the detected voltage function V(t) has a upwardly convex shape, so the period between the time T1 and the time T2 can be distinguished from the period on and after the time T3. As such, it can be controlled that the battery exhaustion is not warned in the period between the time T1 and the time T2. The determination control of warning of the battery exhaustion described above is incorporated in the flowchart of FIG. 7.

Figure 6:
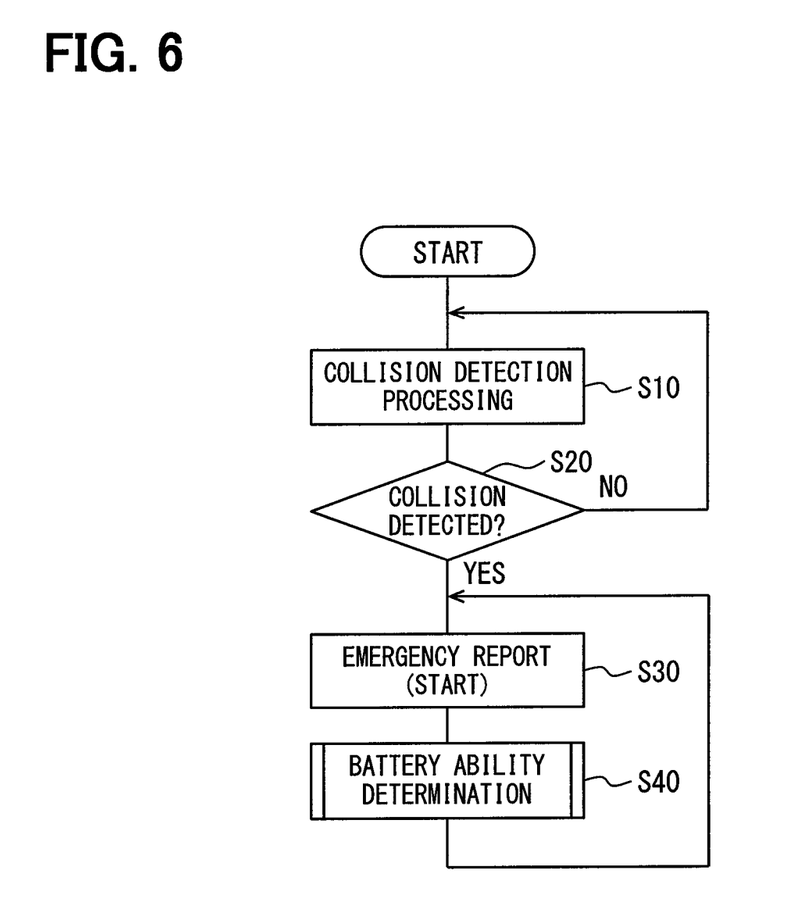
FIG. 6 is a flowchart illustrating contents of a control of the vehicle-mounted emergency report device.
Figure 7:
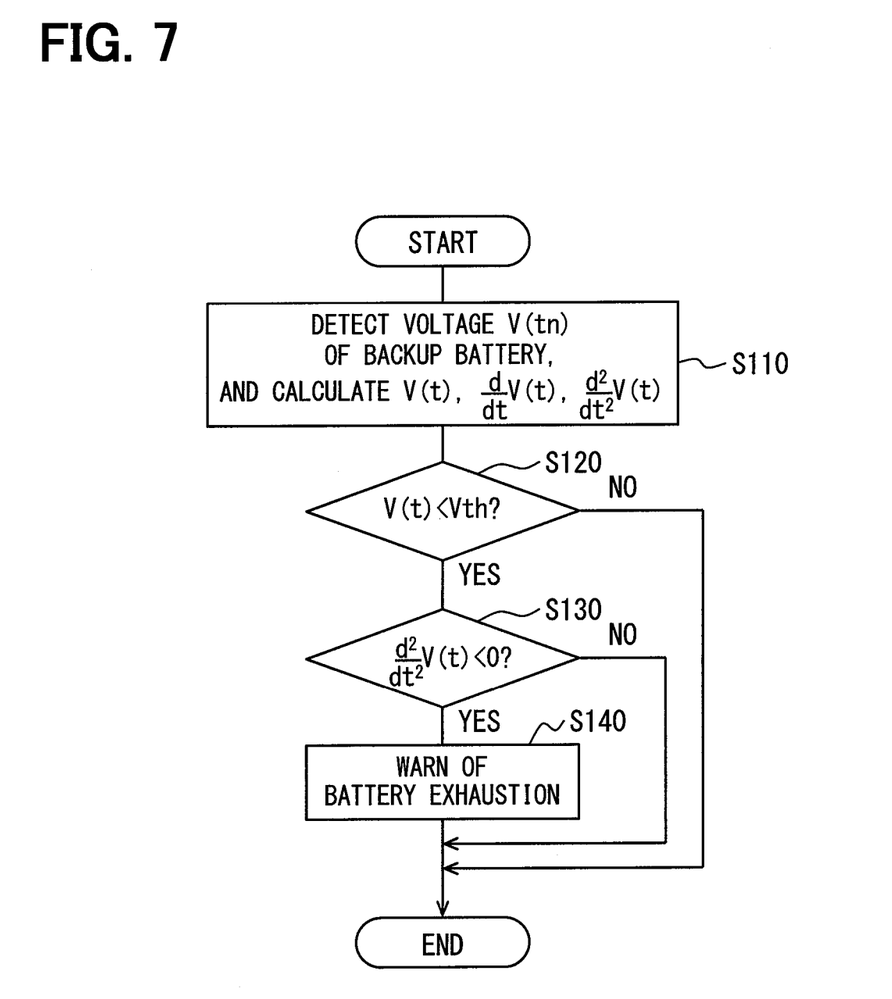
FIG. 7 is a flowchart illustrating contents of a control of determining a battery ability of the backup battery.

A vehicle collision detection processing is executed at S10 in FIG. 6. After the pre-crash detection signal is output from the pre-crash safety ECU 25, the possibility of the vehicle collision is determined, and the radio communication line is connected between the radio communication unit 6 of the vehicle-mounted emergency report device 2 and the center device 3. After the airbag deployment signal is output from the airbag ECU 22, it is determined that the vehicle has collided. After the vehicle collision is determined (S20: YES), the processing proceeds to S30 and an emergency report processing is started. Information transmitted from the vehicle-mounted emergency report device 2 to the center device 3 in the emergency report processing includes the occupant information, the vehicle information and the latest vehicle position information.

After the possibility of the vehicle collision is determined, when the airbag deployment signal is not output from the airbag ECU22 within a predetermined time, it is determined that the vehicle has not collided (S20: NO). In this case, the radio communication line between the radio communication unit 6 and the center device is interrupted, the processing returns to S10, and the vehicle collision detection processing is repeated.

Next, after the emergency report processing is started, the processing proceeds to S40 and a process of determining the battery ability of the backup battery 19 is executed. Specifically, the processing proceeds to S11 of FIG. 7, the voltage of the backup battery 19 is detected by the battery voltage detection unit 21 and the detected voltage value (V($t_n$)) is stored. A predetermined number (for example, 100) of the detected voltage values (V($t_n$)) are required to calculate the detected voltage function V(t). Therefore, when S40 is executed for the first time after the vehicle-mounted emergency report device 2 is turned on, the voltage detection is repeated at the predetermined sampling interval (for example, 1 second) until the predetermined number of the detected voltage values (V($t_n$)) are stored. If the predetermined number of the detected voltage values (V($t_n$)) have been stored already, the voltage is detected once and this detected voltage is stored.

Then, the detected voltage function V(t) is calculated and stored in the memory based on the predetermined number of the detected voltage values (V($t_n$)) stored, specifically, the predetermined number of the detected voltage values (V($t_n$)) including the latest detected voltage value (V($t_n$)). The oldest detected voltage value (V($t_n$)) may be erased from the memory (that is, the predetermined number of the detected voltage values (V($t_n$)) are stored all the time), Alternatively, the oldest detected voltage value (V($t_n$)) may be left (that is, the predetermined number or more of the detected voltage values (V($t_n$)) are stored and erased when lacks there is not sufficient free space in the memory).

Next, the first order differential function d/dt (V(t)) is calculated by differentiating the detected voltage function V(t) by time t and stored. Furthermore, the second order differential function $d^2/d^2t$ (V(t)) is calculated by differentiating the first order differential function d/dt (V(t)) by time t and stored.

Next, the processing proceeds to S120, and it is determined whether the latest detected voltage value (V($t_n$)) is lower (less) than the battery exhaustion warning threshold Vth (as a function of a first determination unit 53 of the CPU 5). When the latest detected voltage value (V($t_n$)) is not lower than the battery exhaustion warning threshold Vth (S120: NO), the battery ability determination processing is finished.

At S120, when the latest detected voltage value (V($t_n$)) is lower than the battery exhaustion warning threshold Vth (S120: YES), the processing proceeds to S130. At S130, it is determined whether the second order differential function $d^2/d^2t$ (V(t)) (that is, a second order differential coefficient $d^2/d^2t$ (V($t_n$))) is negative (as a function of a second determination unit 54 of the CPU 5). When the second order differential function $d^2/d^2t$ (V(t)) is not negative (S130: NO), the battery ability determination processing is finished.

At S130, when the second order differential function $d^2/d^2t$ (V(t)) is negative (S130: YES), the processing proceeds to S140. At S140, a report for warning of the battery exhaustion of the backup battery 19, for example, a voice of a warning message or a sound of a warning alarm is output from the speaker 16 (as a function of a warning unit 55 of the CPU 5). Then the battery ability determination processing is finished.

The above battery ability determination processing (S40 in FIG. 6, that is, S110 to S140 in FIG. 7) is executed at a predetermined interval (for example, every 1 or 10 seconds).

According to the present embodiment, the battery exhaustion is not warned when the detected voltage is lower than the battery exhaustion warning threshold Vth and the second order differential function $d^2/d^2t$ (V(t)) (that is, the second order differential coefficient $d^2/d^2t$ (V($t_n$))) is not negative (when the discharge performance of the backup battery 19 recovers). The battery exhaustion is warned when the second order differential function $d^2/d^2t$ (V(t)) is negative (when the discharge performance of the backup battery 19 does not recover). As a result, the decrease of the discharge performance of the backup battery 19 can be detected accurately.

Second Embodiment

Figure 8:
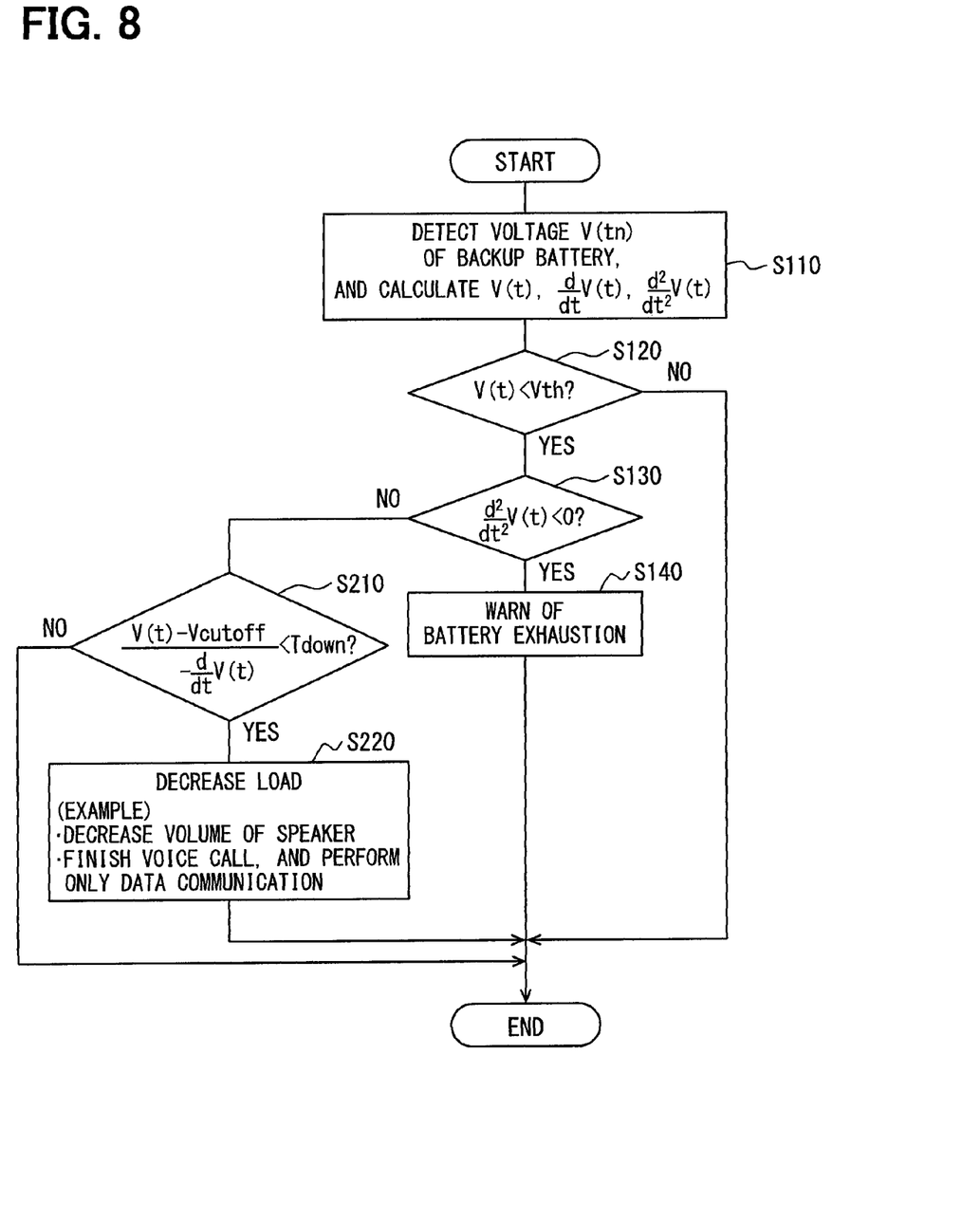
FIG. 8 is a flowchart illustrating contents of a control of determining a battery ability of a backup battery of a vehicle-mounted emergency report device according to a second embodiment of the present disclosure.

FIG. 8 illustrates a second embodiment of the present disclosure. The same section or step as the first embodiment is designated with the same symbol. In the second embodiment, an estimated time until the backup battery 19 becomes inoperative is calculated when the second order differential function $d^2/d^2t$ (V(t)) is not negative (S130: NO). When the estimated time is less than a setup value Tdown, a load is decreased to restrict the backup battery 19 from being inoperative.

Figure 9:
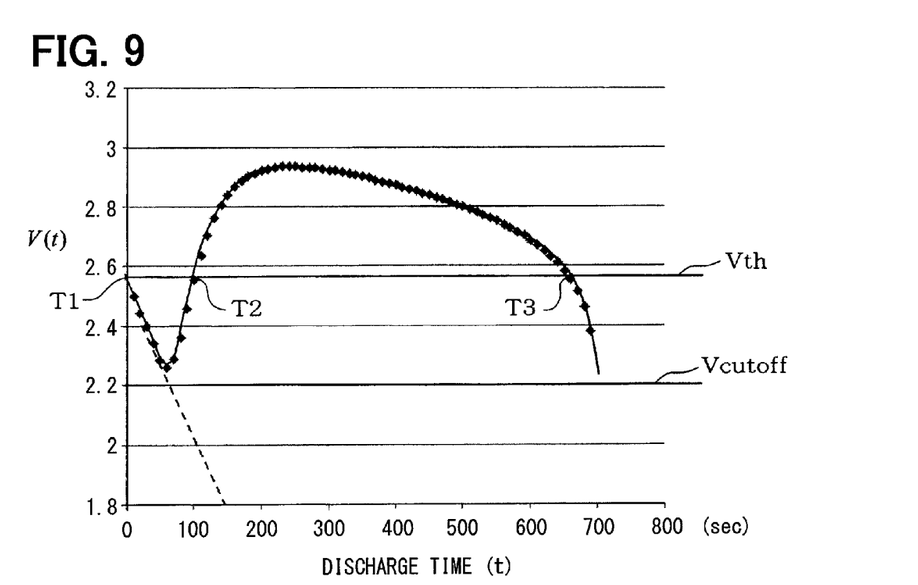
FIG. 9 is a characteristic diagram of a detected voltage function V(t) of the backup battery.
Figure 10:
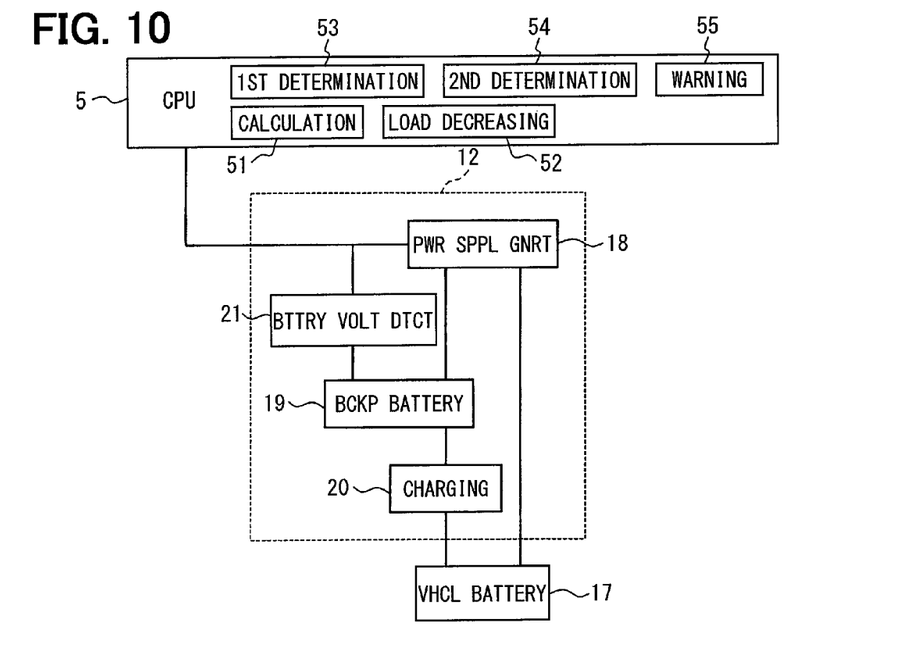
FIG. 10 is a functional block diagram of a power supply control unit of a vehicle-mounted emergency report device according to a second embodiment.

Specifically, the processing from S110 to S130 is similar to that of the first embodiment (see: FIG. 7). At S130, when the second order differential function $d^2/d^2t$ (V(t)) is not negative (S130: NO), the processing proceeds to S210. At S210, the estimated time until the backup battery 19 becomes inoperative is calculated, and it is determined whether the estimated time is less than the setup value Tdown. The estimated time can be calculated by dividing a difference between the present detected voltage value V(t) and the voltage Vcutoff where the battery becomes inoperative by an inclination d/dt (V(t)) calculated from the first order differential function d/dt (V(t)) (see FIG. 9, as a function of a calculation unit 51 of the CPU 5).

At S210, when the estimated time is less than the setup value Tdown (S210: YES), the processing proceeds to S220. At this S220, the load is decreased so that the backup battery 19 can operate (as a function of a load decreasing unit 52 of the CPU 5). Specifically, a volume of the speaker 16 is decreased (decreasing the volume of the call voice), or the voice call is finished and only the data communication is performed. Thereafter, the battery ability determination processing is finished. At S210, when the estimated time is not less than the setup value Tdown (S210: NO), the battery ability determination processing is finished.

The structure other than that described above in the second embodiment is similar to that of the first embodiment. Therefore, similar effects as described in the first embodiment can be achieved in the second embodiment. Especially, according to the second embodiment, when the detected voltage V(t) is lower than the battery exhaustion warning threshold Vth and the second order differential function $d^2/d^2t$ (V(t)) is not negative (S130: NO), the estimated time until the backup battery 19 becomes inoperative is calculated. Since the load is decreased when the estimated time is less than the setup value Tdown, backup battery 19 can be restricted from being inoperative.

In the second embodiment, the volume of the call voice is decreased and the voice call function is finished as examples of restriction functions of various functions among the vehicle-mounted emergency report device 2. However, the restriction functions are not limited to the functions described above, and the power of the radio device of the vehicle-mounted emergency report device 2 may decreased or the other functions may be restricted.

The flowcharts or the processing of the flowcharts described in the present application include plural sections (or referred to as units or steps) and each of the sections is expressed as, for example, S100. The sections may be divided into plural subsections. On the other hand, plural sections may be combined into one section. Furthermore, these sections may be referred to as devices, modules or means.

While only the selected exemplary embodiments have been chosen to illustrate the present disclosure, the present disclosure is not limited to the said embodiments and structures. Various changes and modification can be made in the present disclosure. Furthermore, various combination and formation, and other combination and formation including one, more than one or less than one element can be made in the present disclosure.

What is claimed is:

1. A vehicle-mounted emergency report device mounted in a vehicle that has a function of transmitting an emergency report signal to a center device via a communication network and is configured to operate using electric power supplied from a vehicle battery as operating power, the vehicle-mounted emergency report device comprising:
   a backup battery supplying the operating power to operate the vehicle-mounted emergency report device when the electric power supplied from the vehicle battery decreases;
   a voltage detection unit detecting a voltage of the backup battery;
   a first determination unit determining whether the voltage detected by the voltage detection unit is lower than a battery exhaustion warning threshold;
   a second determination unit determining whether a second order differential coefficient calculated by differentiating a battery voltage function of the backup battery twice by time is negative; and a warning unit:
- refraining from warning of battery exhaustion when the voltage detected is lower than the battery exhaustion warning threshold and the second order differential coefficient is not negative; and
- warning of the battery exhaustion when the voltage detected is lower than the battery exhaustion warning threshold and the second order differential coefficient is negative.

2. The vehicle-mounted emergency report device according to claim 1, comprising:
- a calculation unit calculating an estimated time until the backup battery becomes inoperative when the voltage detected is lower than the battery exhaustion warning threshold and the second order differential coefficient is negative; and
- a load decreasing unit decreasing a load when the estimated time is less than a setup value.

3. The vehicle-mounted emergency report device according to claim 2, wherein
- a voice call is available between an occupant in the vehicle and the center device; and
- the load decreasing unit decreases the load by decreasing a volume of the voice call or finishes the voice call.

4. The vehicle-mounted emergency report device according to claim 1, wherein the backup battery includes a rechargeable battery charged with the electric power supplied from the vehicle battery.

5. The vehicle-mounted emergency report device according to claim 4, wherein the rechargeable battery includes a lithium ion battery or a nickel-hydrogen battery.

* * * * *